Patented Sept. 7, 1954

2,688,621

UNITED STATES PATENT OFFICE 2,688,621

PREPARATION OF THE BIS-LACTONE OF 4,7-DIHYDROXYSEBACIC ACID

Richard S. Urban, Philadelphia, Pa., assignor to Rohm & Haas Company, Philadelphia, Pa., a corporation of Delaware No Drawing. Application March 27, 1953, Serial No. 345,241

1 Claim. (Cl. 260—343.6)

This invention relates to the bis-lacetone of 4,7-dihydroxysebacic acid having the formula

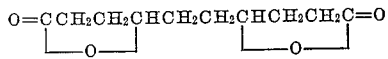

The bis-lactone, in addition to being a valuable chemical intermediate for the manufacture of resins, is in itself useful as a plasticizer for zein. It is made by the hydrogenation of 4,7-diketosebacic acid, the latter being a known compound (Kehrer et al. Annalen 294, 167 (1896). Thus, the diketo acid, preferably in solution, can be hydrogenated very readily in the presence of palladium at a temperature above 100° C.—preferably from 125° to 160° C.—and at a pressure of 50 to 150 atmospheres. Similarly the disodium and dicalcium salts can be hydrogenated under the same conditions in the presence of Raney nickel as a catalyst. Furthermore 4,7-diketosebacic acid is reduced successfully, albeit slowly, at about 30°–50° C. and at pressures as low as atmospheric pressure with hydrogen in the presence of platinum as a catalyst.

The following examples, in which all parts are by weight, illustrate methods of making the bis-lactone of this invention.

Example 1

Twenty parts of 4,7-diketosebacic acid dissolved in 75 parts of ethanol and 75 parts of water was charged to an autoclave together with one part of a palladium catalyst (5% palladium dispersed on alumina). The mixture was treated at a temperature of 150° C. for four hours with hydrogen at a pressure of 1200 lbs./sq. in. After being cooled to room temperature the reaction mixture was removed from the autoclave and was filtered. The filtrate was stripped of ethanol and water under reduced pressure and a yield of 15.4 parts of a viscous oil was obtained. After recrystallization from benzene, a crystalline compound was obtained which melted at 107°–109° C., had neutral equivalent of zero and a saponification equivalent of 98 (as against a calculated value of 99 for the bis-lactone of 4,7-dihydroxysebacic acid) and whose analysis conformed to that of the compound having the formula

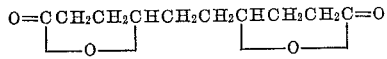

Example 2

Twenty parts of 4,7-diketosebacic acid was suspended in 130 parts of water and to this stirred suspension was slowly added 15 parts of calcium carbonate in order to form the dicalcium salt of the acid. Five parts of Raney nickel was added and the mixture was charged to an autoclave where it was treated for 15 hours at 150° C. with hydrogen at a pressure of 1200 lbs./sq. in. The product was filtered. The filtrate on being dried yielded 20.8 parts of the white, water-soluble dicalcium salt of 4,7-dihydroxysebacic acid. This was dissolved in 50 parts of water and to the solution was added a stoichiometric amount of oxalic acid. The resultant calcium oxalate was removed by filtration and the filtrate was evaporated to yield a product which was identical with the product of Example 1 above.

Ten parts of the bis-lactone, prepared as above, was shaken with 100 parts of concentrated ammonium hydroxide at room temperature. The solid slowly dissolved and then a solid precipitated. After four hours the mixture was cooled by means of an ice bath and was filtered. The residue, on being dried, weighed 8.6 parts. It was recrystallized from water and the crystalline product which melted with decomposition at 189°–192° C. was shown by analysis to be 4,7-dihydroxysebacamide of the formula

H$_2$NCOCH$_2$CH$_2$CH(OH) CH$_2$CH$_2$
　　　　　　　　　　CH(OH) CH$_2$CH$_2$CONH$_2$ which, however, is unstable and reverts to the lactone on being heated.

I claim:
The bis-lactone of 4,7-dihydroxysebacic acid having the formula

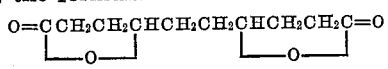

No references cited.